United States Patent

Peng

[11] Patent Number: 6,128,011
[45] Date of Patent: Oct. 3, 2000

[54] CROSS-PLATFORM DIGITAL SIGNAL PROCESSING DESIGNS USING JAVA AND C

[75] Inventor: Jason Peng, Sunnyvale, Calif.

[73] Assignees: Sony Corporation of Japan, Tokyo, Japan; Sony Electronics, Inc., Park Ridge, N.J.

[21] Appl. No.: 09/144,681

[22] Filed: Aug. 31, 1998

[51] Int. Cl.[7] .............................. G06F 3/00; G06F 17/10; G06F 9/45

[52] U.S. Cl. ........................ 345/335; 345/339; 345/970; 709/302; 708/321; 708/300; 717/5

[58] Field of Search .................... 345/335, 339, 345/970, 965, 333, 440; 709/203, 302; 395/500.35, 705, 707; 702/79, 124, 126, 189; 708/300, 321, 303, 306, 400; 703/14; 717/5, 7

[56] References Cited

U.S. PATENT DOCUMENTS

| | | | |
|---|---|---|---|
| 5,337,403 | 8/1994 | Klingman | 345/440 |
| 5,544,067 | 8/1996 | Rostoker et al. | 395/500.35 |
| 5,710,934 | 1/1998 | Bona et al. | 714/724 |
| 5,892,938 | 4/1999 | Eastty et al. | 345/333 X |
| 5,909,684 | 6/1999 | Nelson | 345/333 X |
| 5,956,487 | 9/1999 | Venkatraman et al. | 345/335 X |
| 5,960,201 | 9/1999 | Ma et al. | 395/705 |
| 6,029,000 | 2/2000 | Woolsey et al. | 717/5 |

*Primary Examiner*—Raymond J. Bayerl
*Attorney, Agent, or Firm*—Wagner, Murabito & Hao LLP

[57] ABSTRACT

A platform-independent software-implemented digital signal processing system in a computer system. The digital signal processing system is comprised of a digital signal processing unit implemented in C program code which receives data and applies a process to generate therefrom a computer file representative of a processed response. The digital signal processing system also is comprised of a graphical user interface implemented in Java program code, which generates two-dimensional graphic images and text on the computer system's user output device, and is for receiving user-selected process parameters and for displaying the results of the processed response. In addition, the digital signal processing system is comprised of an interface code which provides communication between the graphical user interface and the digital signal processing unit. The interface code is implemented in Java program code and operable such that the digital signal processing unit and graphical user interface, in combination, are platform-independent. In this manner, the present invention provides a DSP software program that includes a graphical user interface section but yet can be operated across multiple computer system platforms without needing to be redesigned or customized for each platform.

27 Claims, 11 Drawing Sheets

420

420a  420b  420c  420d  420e

| ▼ | No Name | | | |
|---|---|---|---|---|
| Commit | | | | |
| <lband>: | <l>: | <wndo>: | <fln>: | <fhn>: |
| 3 | 20 | 5 | 0.15 | 0.35 |

IIR DESIGN

Commit $<itilt>$: 3

$<iband>$: 1

$<ns>$: 3

$<ls>$: 2

$<nf1>$: 0.15

$<nf2>$: 0

$<nf3>$: 0

$<nf4>$: 0

$<ndb>$: 0

520

CROSS-PLATFORM DIGITAL SIGNAL PROCESSING DESIGNS USING JAVA AND C

TECHNICAL FIELD

The present invention relates to the field of digital signal processing. In particular, the present invention pertains to a computer-controlled tool for digital signal processing design.

BACKGROUND ART

Signal processing refers to performing an operation on a recorded signal; for example, signal processing might entail applying a device such as a filter to a signal to reduce noise and interference. An operation is broadly defined to include software realizations as well as physical realizations of devices such as filters. Accordingly, software can be used to program a computer system to filter an analog signal that has been converted to a digital signal.

The rapid development of computer technology has been paralleled by similarly rapid developments in digital signal processing (DSP). Inexpensive and fast digital circuits make it possible to construct sophisticated computer programs capable of performing complex DSP functions and tasks. In addition, the use of software increases the flexibility to develop operations for specific applications and to modify existing operations. In addition, software can be faster and less expensive than signal processing using a physical device. Some software and computer systems are fast enough to permit on-line processing of digital signals. Hence, software is often used for DSP instead of special or custom circuit devices.

In the prior art, the user applies a DSP computer program to the data representing the signal to be analyzed. The signal represents a physical quantity that varies with time, space, or some other independent variable or variables. The data representing the signal is first converted to digital data using an analog-to-digital converter. The data are stored, and the computer program then retrieves and operates on the digital data in the manner specified by the user. For example, data representing a person's speech can be recorded, converted to a digital signal, then operated on by a DSP computer program to filter out unwanted noise. As another example, an image can be recorded, converted to a digital image, then operated on by a DSP computer program to enhance certain pixels in the image.

In the prior art, a user can develop a computer program using standard processes and functions that are routinely employed in DSP technology and are known in the art. One reference for such functions is "Signal Processing Algorithms in MATLAB," published by Prentice Hall, 1996. A standard MATLAB function is specified in the format of, for example, "sqrt(x)," and a computer program employing that function would have the capability of computing the square root of the elements of "x." Using a combination of such functions with other programming commands, a user can implement a DSP computer program appropriate for his/her needs.

Alternatively, existing in the prior art are commercially available DSP computer programs that can be purchased by a user. Such commercially available DSP computer programs offer advantages for the user who prefers to utilize DSP simply as a tool and whose field of expertise is different from that required to write a DSP program. With a pre-packaged DSP program, the user does not have to do the programming, and hence it is not necessary for the user to be proficient in either the programming language or how to apply that language. The user instead loads the pre-packaged program onto his/her computer system, and then specifies, for example, the type of filter to be applied and the filter's design parameters. The pre-packaged DSP program builds the selected filter type according to the specified parameters. The user then can apply the filter to the data to be analyzed. Thus, the pre-packaged DSP computer programs provide convenience and simplicity to the user, allowing the user to easily develop a powerful tool for digital signal processing.

However, the prior art is problematic in that each pre-packaged DSP program is limited to running only on a single computer system platform. In particular, the graphical user interface associated with each pre-packaged DSP program can not be used across computer system platforms. For example, a Microsoft platform such as Windows 95 may use Visual Basic for the graphical user interface program sections, while a UNIX platform such as Solaris may use Motif. Thus, in the prior art, a DSP computer program that performs on a Microsoft compatible computer system platform is not capable of performing on a UNIX computer system platform, and vice versa. Hence, in the prior art it is necessary to purchase or license more than one version of a DSP program, e.g., one version for each type of computer system platform that is being used. For a company employing a number of analysts and engineers using a variety of platforms, this can result in a substantial expense. In addition, with more than one version of DSP programs being supported, the company's maintenance costs for such things as upgrades are increased commensurately. Also, different DSP software versions will operate differently and may not communicate with each other, which increases the complexity of interactions between engineers and analysts for such common transactions as file transfer and communication of results over the company's internal communication network.

Similarly, the expense to the vendors of DSP programs is also increased due to the need to support multiple computer system platforms. In the prior art, different versions of the same program increase development and manufacturing costs. Increased costs are also associated with the support of multiple versions; for example, upgrades must be prepared for each version, and separate users' manuals must also be written and published. Support technicians on call to respond to user questions and problems also have to be trained on each version.

SUMMARY OF THE INVENTION

Thus, a need exists for a method whereby a single version of a DSP software program performs on more than one type of computer system platform. In addition, a need exists for a method that accomplishes the above need and is compatible with existing computer systems and the experience of current users. The present invention solves these needs. These and other objects and advantages of the present invention will no doubt become obvious to those of ordinary skill in the art after having read the following detailed description of the preferred embodiments which are illustrated in the various drawing figures.

The present invention provides a system method that includes a single version of digital signal processing software that performs on more than one type of computer system platform. The present invention also provides a method that accomplishes the above need and is compatible with existing computer systems and the experience of current users.

Specifically, in the present embodiment, the present invention described herein is a software implemented digital signal processing system in a computer system. The digital signal processing system is comprised of a digital signal processing unit implemented in C program code which receives data and applies a process to generate therefrom a computer file representative of a processed response. The digital signal processing system also is comprised of a graphical user interface implemented in Java program code, which generates two-dimensional graphic images and text on the computer system's user output device, and is for receiving user-selected process parameters and for displaying the results of the processed response. In addition, the digital signal processing system is comprised of an interface code which provides communication between the graphical user interface and the digital signal processing unit. The interface code is implemented in Java program code and operable such that the digital signal processing unit and graphical user interface, in combination, are platform-independent. In this manner, the present invention provides a DSP software program that includes a graphical user interface section but yet can be operated across multiple computer system platforms without needing to be redesigned or customized for each platform.

In accordance with one embodiment of the present invention, the digital signal processing system applies processes for the finite impulse response filter design, the infinite impulse response filter design, the general input and output design, and the constellation display.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5A shows a window on a Solaris platform for specifying filter design parameters in accordance with one embodiment of the present invention.

FIG. 5B shows a window on a Windows platform for specifying filter design parameters in accordance with one embodiment of the present invention.

BEST MODE FOR CARRYING OUT THE INVENTION

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

Figure 1:
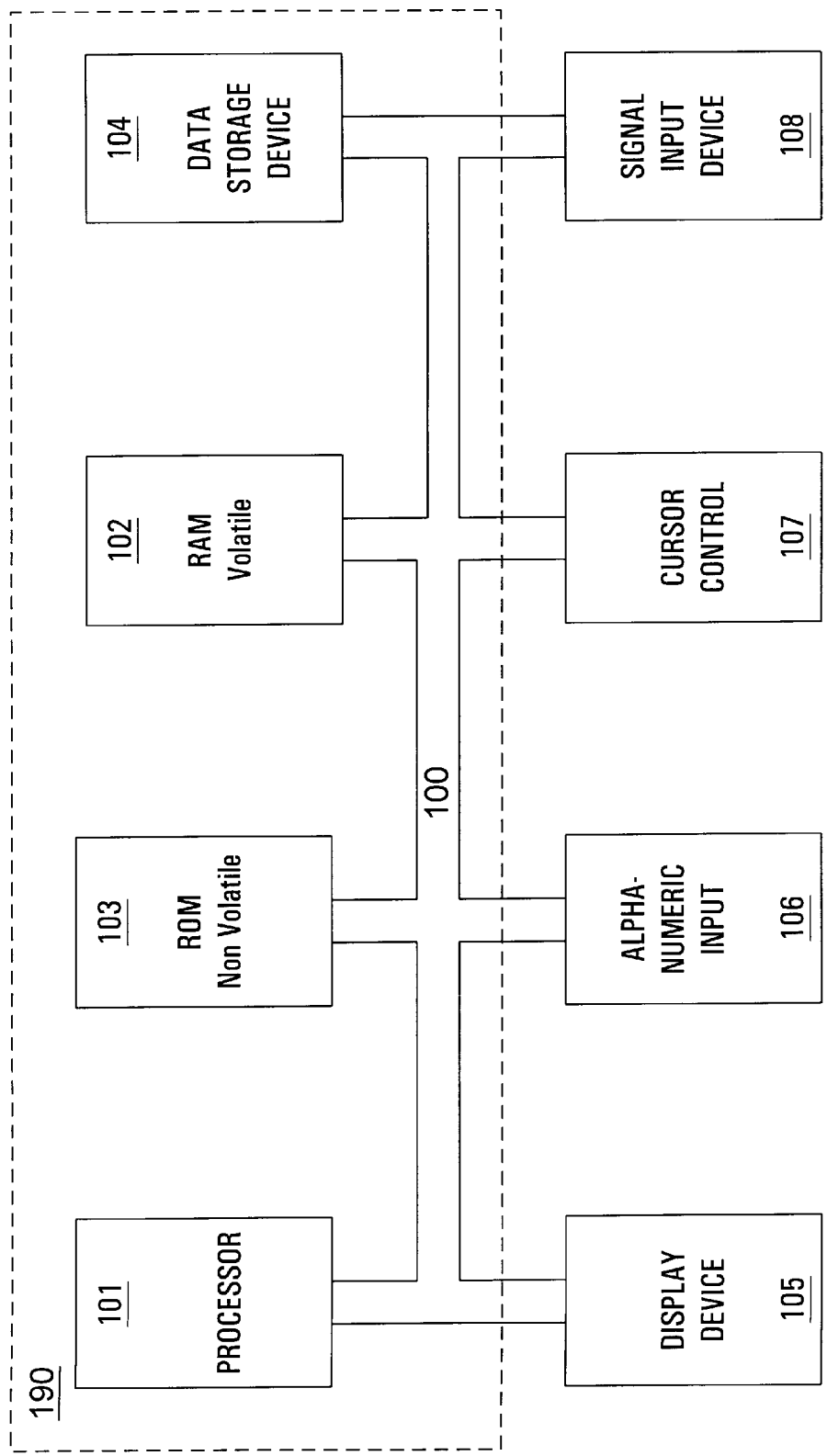
FIG. 1 shows a general purpose computer system upon which the present invention may be practiced.

Refer now to FIG. 1 which illustrates a "platform" or computer system 190 upon which embodiments of the present invention may be practiced. In general, computer system 190 comprises bus 100 for communicating information, processor 101 coupled with bus 100 for processing information and instructions, random access memory 102 coupled with bus 100 for storing information and instructions for processor 101, read-only memory 103 coupled with bus 100 for storing static information and instructions for processor 101, data storage device 104 such as a magnetic or optical disk and disk drive coupled with bus 100 for storing information and instructions, a user output device such as display device 105 coupled to bus 100 for displaying information to the computer user, a user input device such as alphanumeric input device 106 including alphanumeric and function keys coupled to bus 100 for communicating information and command selections to processor 101, a user input device such as cursor control device 107 coupled to bus 100 for communicating user input information and command selections to processor 101, and signal input device 108 coupled to bus 100 for receiving the signal to be processed (e.g., an analog-to-digital converter).

Display device 105 of FIG. 1 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2A:
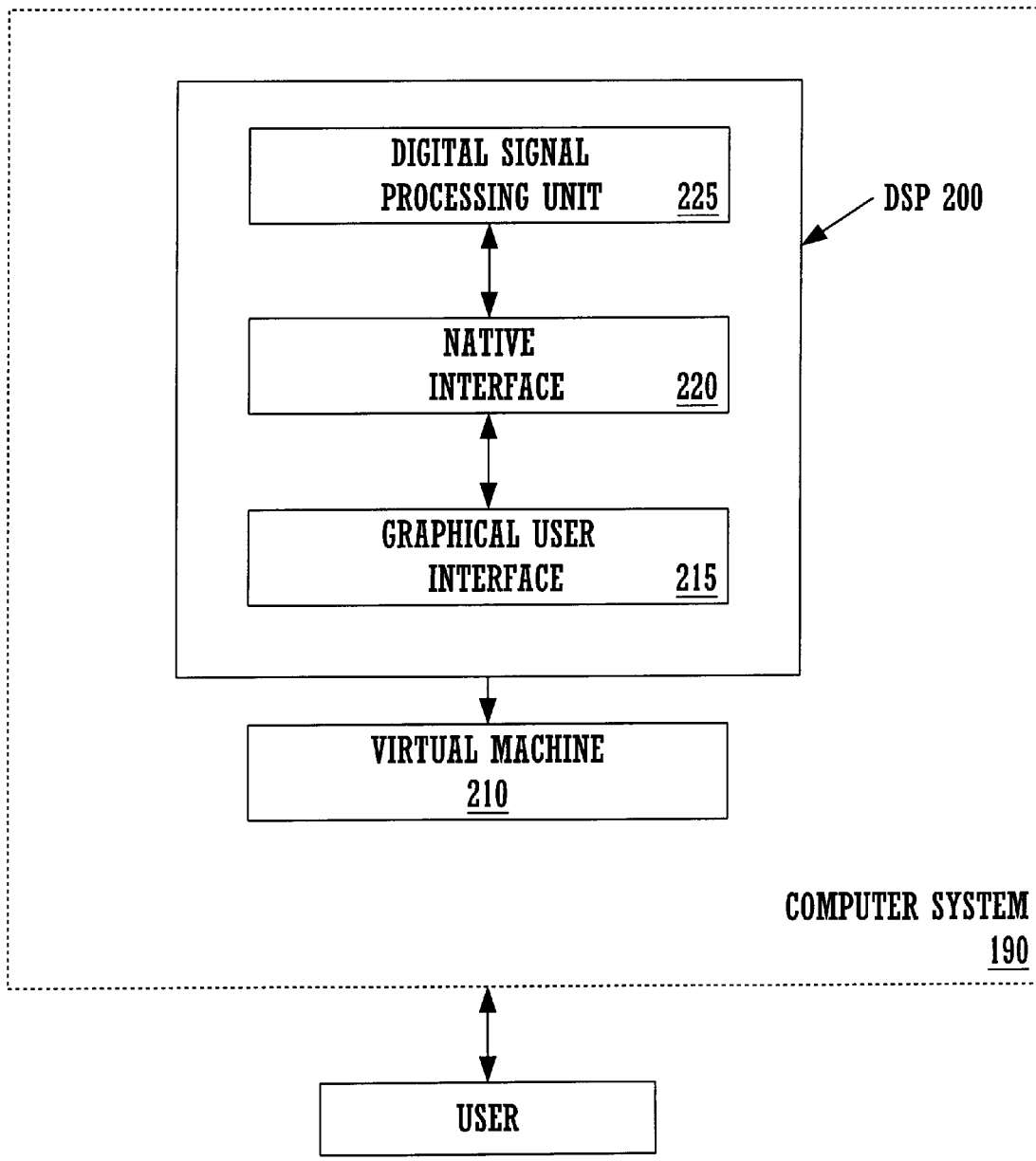
FIG. 2A is a block diagram of a digital signal processing system in accordance with one embodiment of the present invention.

Refer now to FIG. 2A, which shows a block diagram of digital signal processing system (DSP) 200 in accordance with one embodiment of the present invention. DSP 200 is implemented as program instructions capable of being stored in computer-readable memory units of computer system 190 and executed by processor 101 of FIG. 1. In the present embodiment, DSP 200 is comprised of graphical user interface 215, native interface 220, and digital signal processing unit 225. Computer system 190 is a platform implementing, for example, Microsoft Windows 95 or Solaris.

With reference to FIG. 2A, in one embodiment of the present invention, virtual machine 210 is software implemented on computer system 190 in Java program code. Virtual machine 210 is an interpreter that can be used to execute DSP 200 on computer system 190. The use of virtual machine 210 in this fashion is known in the art as a means to translate or interpret a high-level program language into machine language. In the present embodiment, virtual machine 210 is a Java virtual machine used to interpret the Java program code into machine language that can be executed by the computer system.

Continuing with reference to FIG. 2A, graphical user interface 215 is software implemented in Java program code. At the front end of DSP 200, graphical user interface 215 provides a user-friendly interface allowing the user to easily select the type of process (e.g., the type of filter) to be applied to the digital signal and to input the parameters needed to specify the process design. After the digital signal data have been processed, graphical user interface 215 also provides a two-dimensional graphical display illustrating the processed data in a clear manner allowing the user to readily interpret the results. By implementing the graphical user interface in Java program code, the graphical user interface is hardware platform-independent, thereby allowing DSP 200 to also be hardware platform-independent.

With reference still to FIG. 2A, native interface 220 is software implemented in Java program code. Native interface 220 provides an interface between the Java program code used by graphical user interface 215 and the C program code used by digital signal processing unit 225, enabling these two program languages to communicate with each other.

With reference to FIG. 2A, as noted above, digital signal processing unit 225 is software implemented in C program code. In this embodiment, digital signal processing unit 225 incorporates C dynamic libraries consisting of standard processes and functions that are employed in digital signal processing, such as those found in "Signal Processing Algorithms in MATLAB," published by Prentice Hall, 1996. "C dynamic libraries" refers to a collection of programs in C program code that are compiled and ordered. Digital signal processing unit 225 receives the data to be processed, processes the data (e.g., applies a filter) according to the commands and functions specified by the C dynamic libraries, and provides the results of the processing to a computer file contained within a memory unit of computer system 190 (FIG. 1).

Figure 2B:
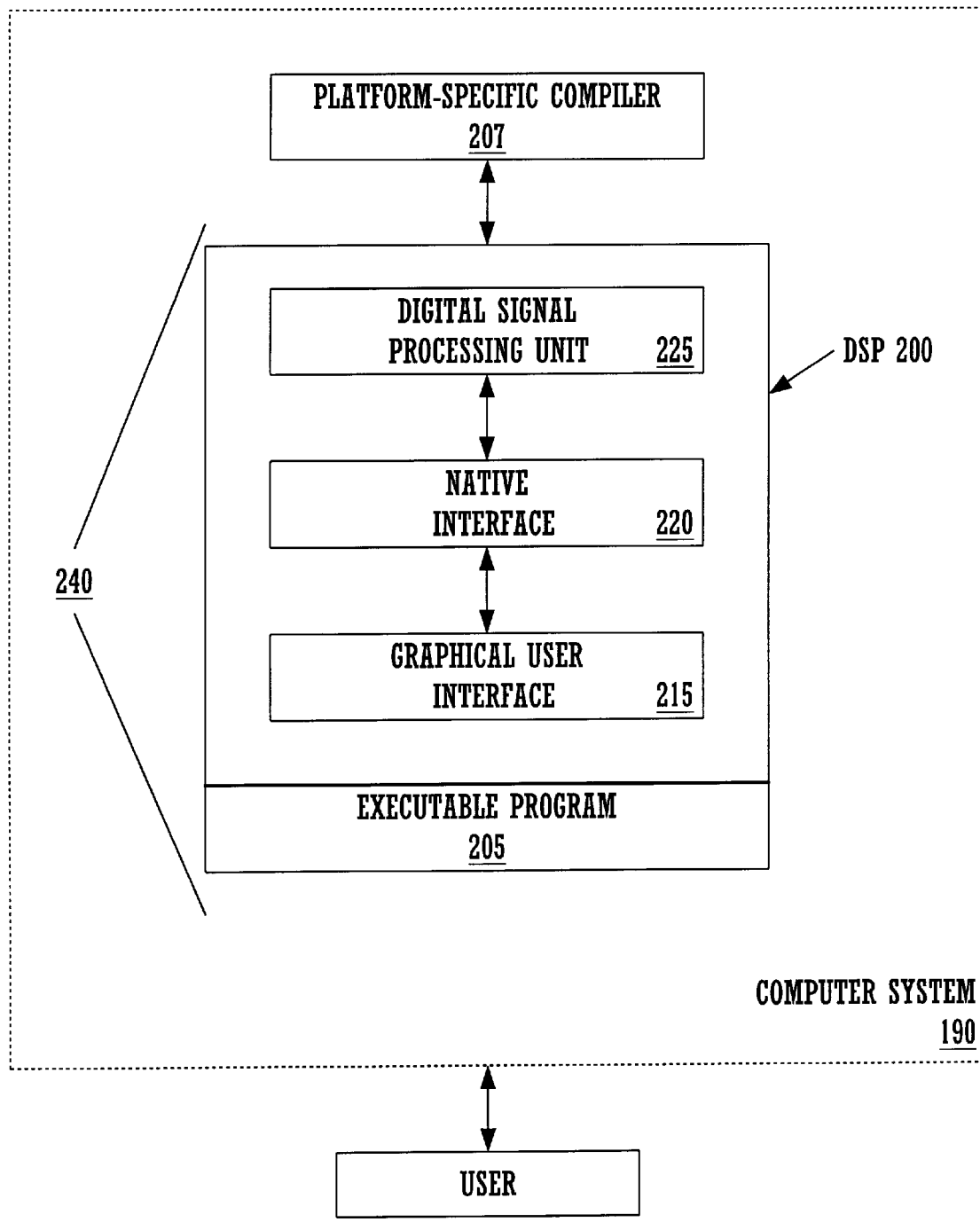
FIG. 2B is a block diagram of a digital signal processing system in accordance with a second embodiment of the present invention.

Refer now to FIG. 2B, which shows an alternate embodiment of the present invention. In this embodiment, before DSP 200 is loaded onto computer system 190, DSP 200 is compiled by a C compiler (not shown) into stand-alone application 240 that also includes executable program 205. Stand-alone application 240 consisting of executable program 205 and DSP 200 is then loaded onto computer system 190 by the user. In this embodiment, the user executes executable program 205, and platform-specific compiler 207 compiles stand-alone application 240 and executes DSP 200. Thus, in this embodiment, executable program 205 allows the user to execute DSP 200 as a C program at the DOS (disk operating system) prompt without the need for an interpreter such as virtual machine 210 in computer system 190.

Figure 3:
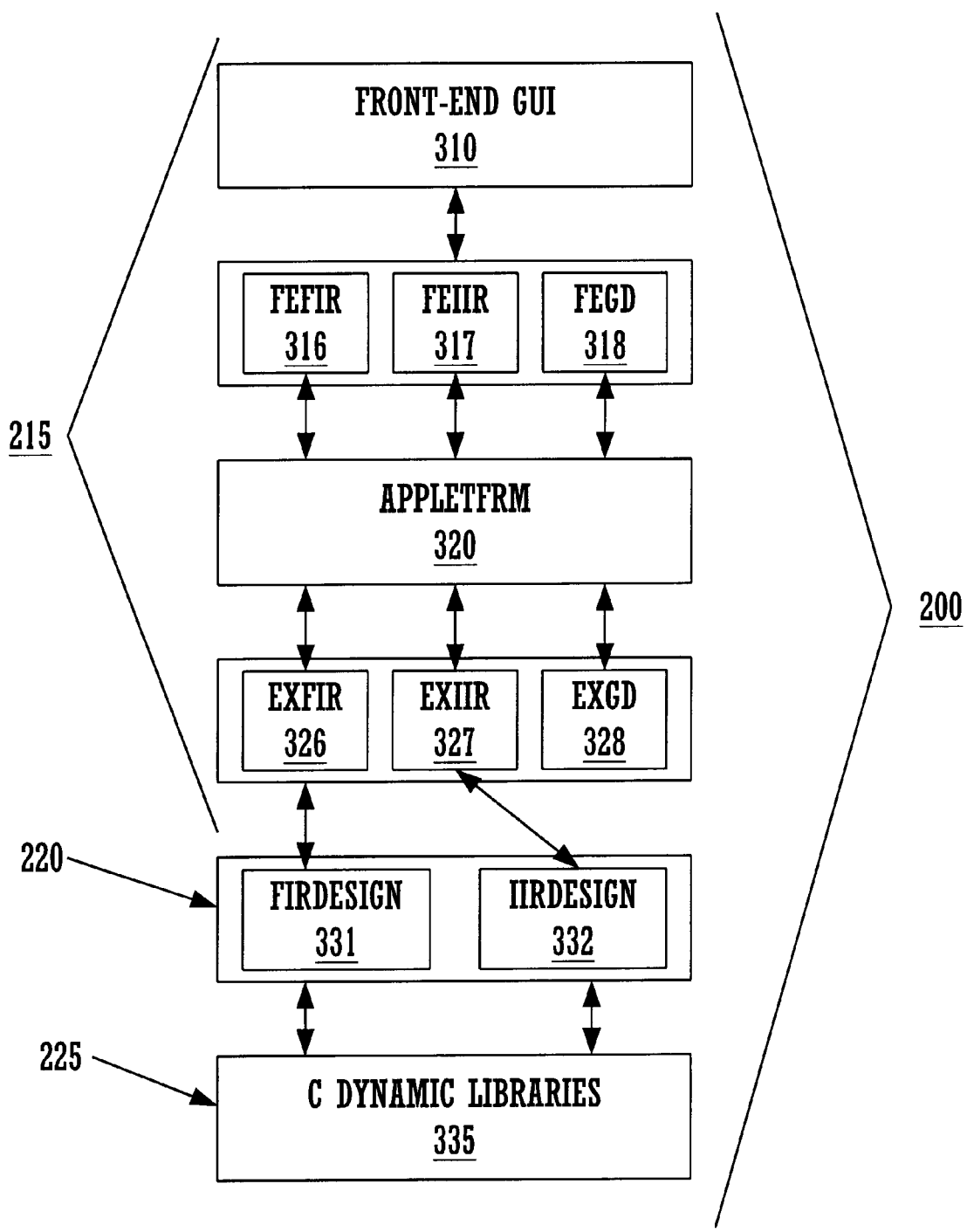
FIG. 3 is a block diagram illustrating implementation of a digital signal processing system in accordance with one embodiment of the present invention.

Refer now to FIG. 3, which represents in more detail the elements of DSP 200 shown in FIGS. 2A and 2B in accordance with one embodiment of the present invention. FIG. 3 shows the arrangement of program instructions stored in computer-readable memory units of computer system 190 and executed by processor 101 of FIG. 1.

With reference to FIG. 3, front-end GUI 310, FEFIR 316, FEIIR 317, FEGD 318, AppletFrm 320, EXFIR 326, EXIIR 327, and EXGD 328 each constitute a portion of graphical user interface 215. Each of these is discussed below.

With reference to FIG. 3, front-end GUI (graphical user interface) 310 provides a user-friendly interface allowing the user to specify the type of process and process design parameters for a DSP operation. Front-end GUI 310 is implemented using the Java program code. Front-end GUI 310 causes a menu bar or icons to be generated and displayed, which the user then uses to specify the type of process to be employed. Depending on the type of process selected, front-end GUI 310 displays sub-menus or other icons to allow the user to specify other aspects of the process design.

In the present embodiment, the types of processes supported by DSP 200 include: finite impulse response (FIR) filter design, infinite impulse response (IIR) filter design, and general input and output design.

In the present embodiment, at the user's option, the FIR filter design displays the amplitude response, the phase response, and the impulse response for low-pass, high-pass, band-pass, and band-stop filters. In addition, the FIR design employs window functions such as rectangular, tapered rectangular, triangular, Hanning, Hamming, and Blackman windows.

In the present embodiment, at the user's option, the IIR filter design displays the amplitude response and the phase response for all bands of filters. In addition, the IIR design consists of the Chebyshev Type I, Chebyshev Type II, and Butterworth filters.

In the present embodiment, the general input and output design supports the processing of general purpose data input files with two-stride X-Y input data. The format of the X-Y input data can be any rational-type number.

An example of front-end GUI 310 specified in accordance with one embodiment of the present invention is described in Code Section A below.

---
Code Section A - Exemplary Front-End GUI
---
```
/**
* Class fegui - Top Front End GUI
* @version %I% %G%
* @see fefir, feiir, fegd
*
*/
import java.awt.*;
import java.awt.event.*;
public class fegui extends Frame implements ActionListener {
    Toolkit toolkit = this.getToolkit();
    Image i = toolkit.getImage("sony.bmp");
        public fegui(String title) {
            super(title);
        this.addWindowListener(new WindowAdapter() {
            public void windowClosing(WindowEvent e) {
                System.exit(0);
            }
        }
        );
        this.setFont(new Font("Helvetica",Font.BOLD,16));
        this.setIconImage(i);
        MenuBar menubar = new MenuBar();
        this.setMenuBar(menubar);
        Menu filter = new Menu("Design Options");
        menubar.add(filter);
        MenuItem fir = new MenuItem("IIR filters", new
        MenuShortcut(KeyEvent.VK_F));
        fir.setActionCommand("fir");
        fir.addActionListener(this);
        filter.add(fir);
        MenuItem iir = new MenuItem("IIR filters", new
        MenuShortcut(KeyEvent.VK_I));
        iir.setActionCommand("iir");
        iir.adActionLstener(this);
        filter.add(iir);
        MenuItem gd = new MenuItem("General I/O", new
        MenuShortcut(KeyEvent.VK_G));
        gd.setActionCommand("gd");
        gd.addActionListener(this);
        filter.add(gd);
        MenuItem quit = new MenuItem("Quit", new
        MenuShortcut(KeyEvent.VK_Q));
        quit.setActionCommand("quit");
        quit.addActionListener(this);
        filter.add(quit);
    Menu help = new Menu("Help");
    menubar.add(help);
    menubar.setHelpMenu(help);
        MenuItem about = new MenuItem("About", new
        MenuShortcut(KeyEvent.VK_H));
        about.setActionCommand("about");
        about.addActionListener(this);
        help.add(about);
        MenuItem frh = new MenuItem("FIR HELP", new
        MenuShortcut(KeyEvent.VK_B));
        firh.SetActionCommand("firh");
        firh.addActionListener(this);
        help.add(firh);
        MenuItem iirh = new MenuItem("IIR HELP", new
        MenuShortcut(KeyEvent.VK_C));
        iirh.setActionCommand("iirh");
        iirh.addActionListener(this);
        help.add(iirh);
        MenuItem gdh = new MenuItem("G I(O HELP", new
        MenuShortcut(KeyEventVK_D));
        gdh.setActionCommand("gdh");
        gdh.addActionListener(this);
        help.add(gdh);
}
public void actionPerformed(ActionEvent e) {
```

---
-continued

Code Section A - Exemplary Front-End GUI
---
```
String command = e.getActionCommand();
if (command.equals("quit")) {
        YesNoDialog d = new YesNoDialog
            (this, "Quit?", "Are you sure you want to quit?",
"Yes", "No", null);
    d.addActionListener(new ActionListener()
        public void actionPerformed(ActionEvent e) {
        if (e.getActionCommand().equals("yes"))
            System.exit(0);
            }
        }
        );
    d.show();
}
else if (command.equals("fir")) {
Frame f = new fefir("FIR DESIGN");
f.setSize(500,150);
f.show();
}
else if (command.equals("iir")) {
Frame f = new feiir("IIR DESIGN");
f.setSize(800,150);
f.show();
}
else if (command.equals("gd")) {
Frame f = new fegd("General Design");
f.setSize(600,150);
f.show();
}
else if (command.equals("about")) {
InfoDialog d1 = new InfoDialog();
d1.show();
}
else if (command.equals("firh")) {
InfoDialog d2 = new InfoDialog(this, "FIR HELP",
    "FIR filter design:\n" +
"<iband>- 1 - lowpass; 2 - highpass;
3 - bandpass; 4 - bandstop\n" +
"<1>- order of filter\n" +
"<wndo>- 1 - rectangular; 2 - tapered rectangular;
    3- triangular; 4 - Hanning; 5 - Hanning, 6
- Blackman\n" +
"<fln>- normalized low cut-off frequency between 0 and 1\n" +
"<fhn>- normalized high cut-off frequency between 0 and 1\n" +
"output files:\n" +
"fra.data - amplitude response (501 sets of x-y points)\n" +
"firp.data - phase reponse (501 sets of x-y points)\n" +
"firi.data - impulse response (length = <1> + 1)");
d2.show();
}
else if (command.equals("iirh")) {
InfoDialog d3 = new InfoDialog(this, "IIR HELP",
    "IIR filter design: " +
"<ifilt>- 1 - Cheb1-passband ripple;2 - cheb2-stopband ripple;
    3 - Butterworth-no ripple\n" +
"<iband>- 1 - lowpass; 2 - highpass;
    3 - bandpass; 4 - bandstop\n" +
"<ns> - number of sections in cascade\n" +
"<ls> - order of each section -
    2 for <iband>= 1, 2; 4 for <iband> = 3, 4\n" +
"<nf1>, <nf2>; <nf3>,
    <nf4> - normalized frequency between 0 and 1\n" +
"<ndb> - dB of stopband rejection,
    only for Cheb. filters\n" +
"output files:\n" +
"iira.data - amplitude response (501 sets of x-y points)\n" +
"iirp.data - phase reponse (501 sets of x-y points)\n" +
"iirc.data - coefficients for each section\n" +
"Notice - only for IIR.\n" +
"Insert 0s to the following options when they are
    not used for filter design,\n" +
"1. <nf3> and <nf4> are not used any lowpass or highpass\n" +
"2. <nf2> is not used with lowpass Butterworth.\n" +
"3. <nf1> is not used with highpass Butterworth."\n" +
"4. <nf1> and nf4 are not used with bandpass Butterworth.\n" +
"5. <nf2> and nf3 are not used with bandstop Butterworth.\n" +
"6. <ndb> dB of stopband rejection. only for Cheb. filters.");
```

Code Section A - Exemplary Front-End GUI (continued)

```
        d3.show(),
    }
    else if(command equals("gdh")) {
    InfoDialog d4 = new InfoDialog(this,
        "General I/O HELP",
        "General design:\n" +
        "<plot title> - input the title for this plot\n" +
        "<input file name> - 1 -
            the file shall contain 2-stride X-Y input\n" +
        "<X-axis name> - input the X-axis name for this plot\n" +
        "<Y-axis name> - input the Y-axis name for this plot");
            d4.show();
        }
    }
        public static void main(String args[]) {
        Frame f = new fegui("Digital Filter Design");
        f.setSize(400,100);
        f.show();
        }
}
```

With reference still to FIG. 3, in the present embodiment, front-end GUI 310 then interfaces with a program corresponding to the filter design specified by the user. FEFIR 316 corresponds to a FIR filter design, FEIIR 317 corresponds to an IIR filter design, and FEGD 318 corresponds to a General Input and Output design. Depending on the type of filter selected by the user, DSP 200 implements either FEFIR 316, FEIIR 317 or FEGD 318. Each of these programs is a continuation of the process initiated by front-end GUI 310 enabling the user to specify the design parameters for the type of filter the user has selected. Each of these programs causes a menu or icon to be displayed, which the user then uses to specify the desired design parameters for the filter. These programs are implemented using the Java program code.

An example of FEFIR 316 specified in accordance with one embodiment of the present invention is described in Code Section B below. (FEIIR 317 specified in accordance with one embodiment of the present invention is described in Code Section C below. FEGD 318 specified in accordance with one embodiment of the present invention is described in Code Section D below.)

Code Section B - Exemplary FEFIR

```
/**
 * Class fefir - The 2nd level Front End GUI
 * @version %I% %G%
 * @see fegui, feiir, fegd
 *
 */
import java.applet.*;
import java.awt.*;
import java.awt.event.*;
public class fefir extends Frame implements ActionListener {
    String args1[] = new String[6];
    Toolkit toolkit = this.getToolkit();
    Image i = toolkit.getImage("fir.bmp");
    public fefir(String title) {
        super(title);
        this.addWindowListener(new WindowAdapter() {
        public void windowClosing(WindowEvent e) {
            e.getWindow().dispose();}
        });
        MenuBar menubar = new MenuBar();
        this.setMenuBar(menubar);
        Menu commit = new Menu("Commit");
        menubar.add(commit);
        MenuItem amp = new MenuItem("Amplitude", new
        MenuShortcut(KeyEvent.VK_A));
        amp.setActionCommand("amp");
        amp.addActionListener(this);
        commit.add(amp);
        MenuItem phase = new MenuItem("Phase", new
        MenuShortcut(KeyEvent.VK_P));
        phase.setActionCommand("phase");
        phase.addActionListener(this);
        commit.add(phase);
        MenuItem imp = new MenuItem("Impulse", new
        MenuShortcut(KeyEvent.VK_I));
        imp.setActionCommand("imp");
        imp.addActionListener(this);
        commit.add(imp);
        this.setFont(new Font("Helvetica",Font.BOLD,14));
        this.setIconImage(i);
        this.setLayout(new GridLayout(1,5,2,2));
        Panel column1 = new Panel();
        this.add(column1,"");
        TextField textfield1 = new Textfield(5);
        column1.add(new Label("<iband>:"));
        column1.add(textfield1);
        Panel column2 = new Panel();
        this.ad(column2"");
        TextField textfield2 = new Textfield(5);
        column2.add(new Label("<l>:"));
        column2;add(textfield2);
        Panel column3 = new Panel();
        this.add(column3,"");
        TextField textfield3 = new TextField(5);
        column3.add(new Label("<wndo>:"));
        column3.add(textfield3);
        Panel column4 = new Panel();
        this.add(column4,"");
        TextField textfield4 = new Textfield(5);
        column4.add(new Label("<fln>:"));
        column4.add(textfield4);
        Panel column5 = new Panel();
        this.add(column5,"");
        Textfield textfield5 = new TextField(5);
        column5.add(new Label("<fhn>:"));
        column5.add(textfield);
        texffield1.addTextListener(new TextListener() {
        public void textValueChanged(TextEvent e) {
        args1[0] = ((TextField)e.getSource()).getText();
/*
        System.out.println(args1[0] +"\n");
*/
        }
        });
        textfield2.addTextListener(new TextListener() {
        public void textValueChanged(TextEvent e) {
        args1[1] = ((TextField)e.getSource()).getText();
/*
        System.out.println(args1[1] +"\n");
*/
        }
        });
        textfield3.addTextListener(new TextListener() {
        public void textValueChanged(TextEvent e) {
        args1[2] = (TextField)e.getSource()).getText();
/*
        System.out.println(args1[2] +"\n");
*/
        }
        });
        textfield4.addTextListener(new TextListener() {
        public void textValueChanged(TextEvent e) {
        args1[3] = ((TextField)e.getSource()).getText();
*/
        System.out.println(args 1[3] +"\n");
*/
        }
        });
```

Code Section B - Exemplary FEFIR

```
        textfield5.addTextListener(new TextListener() {
        public void textValueChanged(TextEvent e) {
        args1[4] = ((TextField)e.getSource()).getText();
*/
     System.out.println(args1[4] +"\n");
*/
        }
        });
    }
    public void actionPerformed(ActionEvent e) {
        String command = e.getActionCommand();
            if (command.equals("amp")) {
            args1[5] = "0";
            }
            else if(command.equals("phase")) {
            args1[5] = "1";
            }
            else if (command.equals("imp")) {
            args1[5] = "2";
            }
            exfir.args = args1;
            0
            exfir applet = new exfir();
            Framef = new AppletFrm("FIR Digital Filter Design",
                applet,500,500);
            if(applet.error!=0)f.dispose();
        }
/*
    public static void main(String[] args) {
    Frame f = new fefir("FIR DESIGN");
    f.pack();
    f.show();
    }
    */
}
```

With reference to FIG. 3, an example of FEIIR 317 specified in accordance with one embodiment of the present invention is described in Code Section C below.

Code Section C - Exemplary FEIIR

```
/**
 * Class feiir - The 2nd level Front End GUI
 * @version %I% %G%
 * @see fegui, fefff, fegd
 *
 */
import java.applet.*;
import java.awt.*;
import java.awt.event.*;
public class feiir extends Frame implements ActionListener {
        String args1[] = new String[10];
        Toolkit toolkit = this.getToolkit();
        Image i = toolkit.getImage("iir.bmp");
    public feifr(String title) {
        super(title);
        this.addWindowListener(newWindowAdapter() {
        public void windowClosing(WindowEvent e) {
            e.getwindow().dispose(); }
            });
            MenuBar menubar = new MenuBar();
            this.setMenuBar(menubar);
            Menu commit = new Menu("Commit");
            menubar.add(commit);
            MenuItem amp = new MenuItem("Amplitude", new
            MenuShortcut(KeyEvent.VK_S));
            amp.setActionCommand("amp");
            amp.addActionListener(this);
            commit.add(amp);
            MenuItem phase = new MenuItem("Phase", new
            MenuShortcut(KeyEvent.VK_T));
```

Code Section C - Exemplary FEIIR

```
            phase.setActionCommand("phase");
            phase.addActionListener(this);
            commit.add(phase);
            this.setFont(new Font("Helvetica",Font.BOLD,14));
            this.setIconImage(i);
        this.setLayout(new GridLayout(1,9,2,2));
    Panel column1 = new Panel();
    this.add(column1,"");
    TextField textfield1 = new Textfield(5);
    column1.add(new Label("<ifilt>:"));
    column1.add(textfield1);
    Panel column2 = new Panel();
    this.add(column2,"");
    TextField textfield2 = new Texfield(5);
    column2.add(new Label("<iband>:"));
    column2.add(textfield2);
    Panel column3 = new Panel();
    this.add(column3,"");
    TextField textfield3 = new TextField(5);
    column3.add(new Label("<ns>:"));
    column3.add(textfield3);
    Panel column4 = new Panel();
    this.add(column4,"");
    TextField textfield4 = new TextField(5);
    column4.add(new Label("<ls>:"));
    column4.add(textfield4);
    Panel column5 = new Panel();
    this.add(column5,"");
    Textfield textfield5 = new TextField(5);
    column5.add(new Label("<nfl>:"));
    column5.add(textfield5);
    Panel column6 = new Panel();
    this.add(column6,""); :
    TextField textfield6 = new TextField(5);
    column6.add(new Label("<nf2>:"));
    column6.add(textfield6);
    Panel column7 = new Panel();
    this.add(column7,"");
    TextField textfield7 = new TextField(5);
    column7.add(new Label("<nf3>:"));
    column7.add(textfield7);
    Panel column8 = new Panel();
    this.add(column8,"");
    Textfield textfield8 = new TextField(5);
    column8.add(new Label("<nf4>:"));
    column8.add(textfield8);
    Panel column9 = new Panel();
    this.add(column9,"");
    TextField textfield9 = new TextField(5);
    column9.add(new Label("<ndb>:"));
    column9.add(textfield9);
    textfield1.addTextListener(new TextListener() {
    public void textValueChanged(TextEvent e) {
    args1[0] = (TextField)e.getSource()).getText();
/*
    System.out.println(args1[0] +"\n");
*/
    }
    });
    textfield2.addTextListener(new TextListener() {
    public void textValueChanged(TextEvent e) {
    args1[1] = (TextField)e.getSource()).getText();
/*
    System.out.prinln(args1[1] +"\n");
*/
    }
    });
    textfield3.addTextListener(new TextListener() {
    public void textValueChangedTextEvent e) {
    args1[2] = (TextField)e.getSource()).getText();
/*
    System.out.println(args1[2] +"\n");
*/
    }
    });
    textfield4.addTextListener(new TextListener() {
    public void textValueChangedTextEvent e) {
```

Code Section C - Exemplary FEIIR

```
        args1[3] = (TextField)e.getSource()).getText();
/*
        System.out.println(args1[3] +"\n");
*/
        }
    });
    textfield5.addTextListener(new TextListener() {
    public void textValueChangedTextEvent e) {
        args1[4] = (TextField)e.getSource()).getText();
/*
        System.out.println(argsl[4] +"\n");
*/
        }
    });
    textfield6.addTextListener(new TextListener() {
    public void textValueChangedTextEvent e) {
        args1[5] (TextField)e.getSource()).getText();
/*
        System.out println(args1[5] +"\n"),
*/
        }
    });
    textfield7.addTextListener(new TextListener() {
    public void textValueChanged(TextEvent e) {
        args1[6] = (TextField)e.getsource()).getText();
/*
        System.out.println(args1[6] +"\n");
*/
        }
    });
    textfield8.addTextListener(newTextListener() {
    public void textValueChanged(TextEvent e) {
        args1[7] = ((TextField)e.getSource()).getText();
/*
        System.out.println(args1[7] +"\n");
*/
        }
    });
    textfield9.addTextListener(new TextListener() {
    public void textValueChanged(TextEvent e) {
        args1[8] = (TextField)e.getSource()).getText();
/*
        System.out.println(args1[8] +"\n");
*/
        }
    });
    public void actionPerformed(ActionEvent e) {
        String command = e.getActionCommand();
            if(command.equals("amp")) {
                args1[9] = "0";
            }
            else if (command.equals("phase")) {
                args1[9] ="1";
            }
            exiir.args = args1;
            exiir applet = new exiir();
            Frame f = new AppletFrm("IIR Digital Filter Design",
            applet,500,500);
            if(applet.error!= 0)f.dispose();
    }
/*
    public static void main(String[] args) {
    Frame f = new feiir("IIR DESIGN");
    f.pack();
    f.show();
        }
*/
}
```

Code Section D - Exemplary FEGD

```
import java.applet.*;
import java.awt.*;
import java.awt.event.*;
public class fegd extends Frame implements ActionListener {
    String args1[] = new String[4];
    Toolkit toolkit = this.getToolkit();
    Image i= toolkit.getImage("gd.bmp");
    public fegd(String title) {
        super(title);
        this.addWindowListener(new WindowAdapter() {
        public void windowClosing(WindowEvent e) {
            e.getWindow().dispose(); }
        });
        MenuBar menubar = new MenuBar();
        this.setMenuBar(menubar);
        Menu commit = new Menu("Commit");
        menubar.add(commit);
        MenuItem plot = new MenuItem("Plot", new
        MenuShortcut(KeyEvent.VK_P));
        plot.setActionCommand("plot");
        plot.addActionListener(this);
        commit.add(plot);
        this.setFont(new Font("Helvetica",Font.BOLD,14));
        this.setIconImage(i);
        this.setLayout(new GridLayout(1,4,2,2));
Panel column1 = new Panel();
this.add(column1,"");
TextField textfield1 = new TextField(10);
column1.add(new Label("<plot title>:"));
column1.add(textfieldl);
Panel column2 = new Panel();
this.add(column2,""),
TextField textfield2 = new TextField(10);
column2.add(new Label("<input file name>:"));
column2.add(textfield2);
Panel column3 = new Panel();
this.add(column3,"");
TextField textfield3 = new TextField(10);
column3.add(new Label("<X-axis name>:"));
column3.add(textfield3);
Panel column4 = new Panel();
this.add(column4,"");
TextField textfield4 = new Textfield(10);
column4.add(new Label("<Y-anix name>:"));
column4.add(textfield4);
textfield1.addTextListener(new TextListener() {
public void textValueChanged(TextEvent e)
args1[0] = ((TextField)e.getSource()).getText();
/*
    System.out.println(args1[0] +"\n");
*/
    }
});
textfield2.addTextListener(new TextListener() {
public void textValueChanged(TextEvent e) {
args1[1] = ((TextField)e.getSource()).getText();
/*
    System.out.println(args1[1] +"\n");
*/
    }
});
textfield3.addTextListener(new TextListener() {
public void textValueChanged(TextEvent e)
args1[2] = (TextField)e.getSource()).getText();
/*
    System.out.println(args1[2] +"\n");
*/
    }
});
textfield4.addTextListener(new TextListener() {
public void textValueChanged(TextEvent e) {
args1[3] = ((TextField)e.getSource()).getText();
/*
    System.out.println(args1[3] +"\n");
*/
    }
});
```

With reference to FIG. 3, an example of FEGD 318 specified in accordance with one embodiment of the present invention is described in Code Section D below.

Code Section D - Exemplary FEGD

```
        }
        public void actionPerformed(ActionEvent e) {
            String command = e.getActionCommand();
                if(command.equals("plot")) {
                    exgd.args = args1;
                    exgd applet = new exgd();
                    Frame f = new AppleFrm("General Design",
                        applet,500,500);
                }
        }
/*
        public static void main(String[] args) {
            Frame f= new feiir("GENERAL DESIGN");
            f.pack();
            f.show();
        }
*/
}
```

Continuing with reference to FIG. 3, AppletFrm 320 is used to generate windows on display device 105 of FIG. 1. These windows are used to display the menus and icons generated by graphical user interface 215, and also to display the graphical results of the digital signal processing. AppletFrm 320 is also used to enable the user to print the results directly from the display window.

The user can resize the window displays by manipulating the computer system's user input device (e.g., cursor control device 107 of FIG. 1) or by inputting preferred values into a table displayed within the window by the graphical user interface. AppletFrm 320 is implemented using the Java program code.

An example of AppletFrm 320 specified in accordance with one embodiment of the present invention is described in Code Section E below.

Code Section E - Exemplary AppletFrm

```
/**
* Class AppletFrm - Interface between Standalone app. and Applet
* @version %I% %G%
* @see fefir, feiir, fegd, exfir, exiir, exgd
*
*/
import java.applet.*;
importjava.awt.*;
import java.awt.event.*;
*import java.util.*;
public class AppletFrm extends Frame {_
    private Properties printprefs = new Properties();
    Toolkit toolkit = this.getToolkit();
    Image i = toolkit.getImage("plot.bmp");
        public AppletFrm(final String title,
            final Applet applet, int width,
                int height){
                super(title);
    // Add a print button.
    this.setIconImage(i);
    Button b = new Button("Print");
    this.add(b,"South");
        this.add(applet,"Center");
        this.setSize(width,height);
        this.show();
    // Call the print() method when the button is clicked.
    // Note anonymous class.
    b.addActionListener(new ActionListener() {
    public void actionPerformed(ActionEvent e) { print(title); }
    });
        this.addWindowListener(new WindowAdapter() {
```

Code Section E - Exemplary AppletFrm

```
            public void windowClosing(WindowEvent e)
                {e.getWindow().dispose();}
        });
        applet.init();
        applet.start();
}
void print(String title) {
// Obtain a Printjob and a Graphics object to use with it
Toolkit toolkit = this.getToolkit();
PrintJob job = toolkit.getPrintJob(this,title,printprefs);
if (job == null) return; // If the user clicked Cancel in the print dialog
Graphics g = job.getGraphics();
// Finish up.
        g.dispose();    //End the page
        job.end();      //End the job
    }
}
```

With reference again to FIG. 3, in the present embodiment, AppletFrm 320 interfaces with either EXFIR 326 corresponding to a FIR filter design, EXIIR 327 corresponding to an IIR filter design, or EXGD 328 corresponding to a general input and output design, depending on the type of filter selected by the user. These programs communicate with C dynamic libraries 335 to receive the processed data. Then, using the windows generated by AppletFrm 320, the processed data is displayed as plots and figures and/or printed. These programs are implemented using the Java program code.

An example of EXFIR 326 specified in accordance with one embodiment of the present invention is described in Code Section F below. (EXIIR 327 specified in accordance with one embodiment of the present invention is described in Code Section G below. EXGD 328 specified in accordance with one embodiment of the present invention is described in Code Section H below.)

Code Section F - Exemplary EXFIR

```
/**
* Class exfir- excution unit for fefir
* @version %I% %G%
* @see fefir
*
*/
import java.awt.*;
import java.applet.*;
import java.io.FileInputStream;
import graphics.*;
import firdesign;
public class exfir extends Applet {
    LoadData dynamic;
    G2Dint graph;
    Label title;
    DataSet data1;
    Axis   xaxis;
    Axis   yaxis;
    Double d2str;
    int i2str;
    int error;
    static String args[];
    String argsdown;
    public void init() {
        int i;
        int j;
        double args 1[] = new double[args.length];
        for(i = 0; i < args.length - 1 ; i++)
        {
```

Code Section F - Exemplary EXFIR -continued

```
        d2str = Double.valueOf(args[i]);
        args 1[i] = d2str.doubleValue();
        }
        argsdown = new firdesign().firdd(args1);
/*
*/
    System.out.println("The error is:" + argsdown);
/*
        error = Integer.parseInt(argsdown);
        if (error ! = 0)
        {
    switch(error) {
    case 1:
    System.err.println("ERROR 1 - Invalid order of filter <l>
        -1 <= 0 || 1 > 100\n");
    this.destroy();
    break;
    case 2:
    System.err.println("ERROR 2 - Invalid window type <wndo >
        - wndo < 1 || wndo > 6\n");
    this.destroy();
    break;
    case 3:
    System.err.println("ERROR 3 - Invalid filter type <iband >
        - iband < 1 || iband > 4\n");
    this.destroy();
    break;
    case4:
    System.err.println("ERROR 4 - Invalid cut-off frequency
        < fln > <fhn > \n");
    System.err.println("fln < 0.0 ||
        fln > 0.5 || (iband >= 3 && fln >=
        fhn) || (iband >= 3 && fhn >= 0.5)
        \n");
    this.destroy();
    break;
    default:
    System.err.println("ERROR = "+argsdown);
    this.destroy();
    }
}
    graph = new2 G2Dint();
    dynamic = new LoadData();
    graph.borderTop = 30;
    graph.borderBottom = 10;
    graph.borderRight = 60;
    graph.setDataBackground(new Color(50,50,200));
    graph.setGraphBackground(new Color(135,206,235));
/*
**  Build the title and place it at the top of the graph
*/
    graph.setFont(new Font("TimesRoman", Font.PLAIN,25));
    title = new Label("FIR", Label.CENTER);
    title.setFont(new Font("TimesRoman",Font.PLAIN,25));
    setLayout(new BorderLayout());
    add("North", title);
    add("Center", graph);
    xaxis = graph.createXAxis();
    yaxis = graph.createYAxis();
    i2str = Integer.parseInt(args[5]);
    switch(i2str) {
    case 0:
    try {
    data1 = dynamic.loadDataSet
        (new FileInputStream("fira.data"), graph);
    } catch (Exception e) {
        System.out.println("Failed to load data file!");
        }
    xaxis.setTitleText("Frequency");
    yaxis.setTitleText("Amplitude");
    break;
    case 1:
    try {
/*
**  Start a new thread and load the data
*/
    data1 = dynamic.loadDataSet(new FileInputStream
```

Code Section F - Exemplary EXFIR -continued

```
        ("firp.data"), graph);
    } catch (Exception e) {
        System.out.println("Failed to load data file!");
        }
    xaxis.setTitleText("Frequency");
    yaxis.setTitleText("Degree");
        break;
    case 2:
    try {
    data1 = dynamic.loadDataSet(new FileInputStream
        ("firi.data"),graph);
    } catch (Exception e) {
        System.out.println("Failed to load data file!");
        }
    xaxis.setTitleText("Order");
    yaxis.setTitleText("Amplitude");
        break;
        default:
        System.out.println("Failed to load data file!");
        break;
    }
/*
**  Specify the data line color
*/
    data1.linecolor = new Color(255,255,0);
/*
**  Instantiate the xaxis and attach the dataset.
*/
    xaxis.attachDataSet(data1);
    xaxis.setTitleColor(Color.black);
    xaxis.setTitleFont(new Font("TimesRoman",Font.ITALIC,25));
    xaxis.setLabelFont(new Font("Helvetica",Font.PLAIN,20));
/*
**  Instantiate the yaxis and attach the dataset.
*/
    yaxis.attachDataSet(data1);
    yaxis.setTitleColor(Color.black);
    yaxis.setTitleFont(new Font("TimesRoman",Font.ITALIC,25));
    yaxis.setLabelFont(new Font("Helvetica",Font.PLAIN,20));
    data1.xaxis.maximum = 1.0;
    data1.xaxis.minimum = 0.0;
    data1.yaxis.maximum = 1.5;
    data1.yaxis.minimum = 0.0;
    }
}
```

With reference to FIG. 3, an example of EXIIR 327 specified in accordance with one embodiment of the present invention is described in Code Section G below.

Code Section G - Exemplary EXIIR

```
/**
 * Class exiir - excution unit for feiir
 * @version %I% %G%
 * @seefeiir
 *
 */
import java.awt.*;
import java.applet.*;
import java.io.FileInputStream;
import graphics.*;
import iirdesign;
public class exiir extends Applet {
    LoadData dynamic;
    G2Dint graph;
    Label title;
    DataSet data1;
    Axis   xaxis;
    Axis   yaxis;
    Double d2str;
    int i2str;
```

Code Section G - Exemplary EXIIR (continued)

```
    int error;
    static String args[];
    String argsdown;
    public void init() {
      int i;
      int j;
        double args1[] = new double[args.length];
        for(i = 0; i < args.length -1 ; i++)
        }
        d2str = Double.valueOf(args[i]);
        args1[i] = d2str.doubleValue();
        }
        argsdown = new iirdesign().iirdd(args1);
/*
System.out.println("The error is:" + argsdown);
*/
    error = Integer.parseInt(argsdown);
    if(error != 0)
      {
        switch(error) {
        case 1:
        System.err.println("ERROR 1 - all zero transfer function\n");
        this.destroy();
        break;
        case 2:
        System.err.println("ERROR 2 - invalid transfer function\n");
        this.destroy();
        break;
        case 3:
        System.err.println("ERROR 3 - filter order exceeds array size
            \n");
        this.destroy();
        break;
        case 4:
        System.err.println("ERROR 4 - invalid filter type parameter
            <iband >-\n");
        System.err.println("iband < 1 || iband
            > 4\n");
        this.destroy();
        break;
        case 5:
        System.err.println("ERROR 5 -
            invalid cut-off frequency\n");
        this.destroy();
        break;
        case 6:
        System.err.println("ERROR 6 -
            out of range on <ifilt > or <iband> or <ns> \n");
        System.err.println("(ifilt <1 ||
            ifilt> 3) || (iband <1 || iband > 4) || ns =< 0\n");
        this.destroy();
        break;
        case7:
        System.err.printin("ERROR 7 - invalid cut-off frequecy \n");
        this.destroy();
        break;
        default:
        System.err.println("ERROR = "+argsdown);
        this.destroy();
        }
      }
    graph = new G2Dint();
    dynamic = new LoadData();
    graph.borderTop = 30;
    graph.borderBottom = 10;
    graph.borderRight = 60;
    graph.setDataBackground(new Color(50,50,200));
    graph.setGraphBackground(new Color(135,206,235));
/*
**  Build the title and place it at the top of the graph
*/
    graph.setFont(new Font("TimesRoman",Font.PLAIN,25));
    title new Label("IIR", Label.CENTER);
    title.setFont(new Font("TimesRoman",Font.PLAIN,25));
    setLayout(new BorderLayout());
    add("North", title);
    add("Center", graph);
```

Code Section G - Exemplary EXIIR (continued)

```
    xaxis = graph.createXAxis();
    yaxis = graph.createYAxis();
    i2str = Integer.parseInt(args[9]);
    switch(i2str) {
    case 0:
    try {
    data1 = dynamic.loadDataSet
        (new FileInputStream("iira.data"), graph);
    } catch Exception e) {
      System.out.println("Failed to load data file!");
    }
    xaxis.setTitleText("Frequency");
    yaxis.setTitleText("Amplitude");
      break;
    case 1:
    try {
/*
** Start a new thread and load the data
*/
    data1 = dynamic.loadDataSet
        (new FileInputStream("iirp.data"), graph);
    } catch Exception e) {
    System.out.println("Failed to load data file!");
    }
    xaxis.setTitleText("Frequency");
    yaxis.setTitleText("Degree");
      break;
      default:
        System.out.println("Failed to load data file!");
        break;
        }
/*
** Specify the data line color.
*/
    data1.linecolor = new Color(255,255,0);
/*
** Instantiate the xaxis and attach the dataset.
*/
    xaxis.attachDataset(data1);
    xaxis.setTitleColor(Color.black);
    xaxis.setTitleFont(new Font("TimesRoman",Font.ITALIC,25)),
    xaxis.setLabelFont(new Font("Helvetica",Font.PLAIN,20));
/*
** Instantiate the yaxis and attach the dataset.
*/
    yaxis.attachDataSet(data1);
    yaxis.setTitleColor(Color.black);
    yaxis.setTitleFont(new Font("TimesRoman",Font.ITALIC,25));
    yaxis.setLabelFont(new Font("Helvetica",Font.PLAIN,20));
    data1.xaxis.maximum = 1.0;
    data1.xaxis.minimum = 0.0;
    data1.yaxis.maximum = 1.5;
    data1.yaxis.minimum = 0.0;
      }
}
```

With reference to FIG. 3, an example of EXGD 328 specified in accordance with one embodiment of the present invention is described in Code Section H below.

Code Section H - Exemplary EXGD

```
/**
* Class exgd - excution unit for fegd
* @version %I% %G%
* @see fegd
*
*/
import java.awt.*;
import java.applet.*;
import java.io.FileInputStream;
import graphics.*;
```

-continued

Code Section H - Exemplary EXGD

```
public class exgd extends Applet {
    LoadData dynamic;
    G2Dint graph;
    Label title;
    DataSet data1;
    Axis   xaxis;
    Axis   yaxis;
    Double d2str;
    int error;
    static String args[];
    public void init() {
        int i;
        int j;
            graph = new G2Dint();
            dynamic = new LoadData();
            graph.borderTop = 30;
            graph.borderBottom = 10;
            graph.borderRight = 60;
            graph.setDataBackground(new Color(50,50,200));
            graph.setGraphBackground(new Color(135,206,235));
/*
**  Build the title and place it at the top of the graph
*/
        graph.setFont(new Font("TimesRoman",Font.PLAIN,25));
        title = new Label(args[0], Label.CENTER);
        title.setFont(new Font("TimesRoman",Font.PLAIN,25));
        setLayout(new BorderLayout());
        add("North", title);
        add("Center", graph);
        xaxis = graph.createXAxis();
        yaxis = graph.createYAxis();
        try {
        data1 = dynamic.loadDataSet(new FileInputStream(args[1]), graph);
        } catch (Exception e) {
            System.err.println("Failed to load data file!");
        }
        xaxis.setTitleText(args[2]);
        yaxis.setTitleText(args[3]);
/*
**  Specify the data line color
*/
        data1.linecolor = new Color(255,255,0);
*/
**  Instantiate the xaxis and attach the dataset.
/*
        xaxis.attachDataSet(data1);
        xaxis.setTitleColor(Color.black);
        xaxis.setTitleFont(new Font("TimesRoman",Font.ITALIC,25));
        xaxis.setLabelFont(new Font("Helvetica",Font.PLAIN,20));
/*
**  Instantiate the yaxis and attach the dataset.
*/
        yaxis.attachDataSet(data 1);.
        yaxis.setTitleColor(Color.black);
        yaxis.setTitleFont(new Font("TimesRoman",Font.ITALIC,25)),
        yaxis.setLabelFont(new Font("Helvetica",Font.PLAIN,20));
        data1.xaxis.maximum = 1.0;
        data1.xaxis.minimum = 0.0;
        data1.yaxis.maximum = 1.5;
        data1.yaxis.minimum = 0.0;
        }
}
```

With reference still to FIG. 3, in the present embodiment, native interface 220 serves to provide the interface between the Java program code utilized in the preceding steps of DSP 200 and the C program code utilized in C dynamic libraries 335. Native interface 220 is written in Java program code but, from the perspective of the C library, it functions like a C program, and in this manner it enables a Java program to call a C library. Native interface 220 is written such that it is platform-independent. Native interface 220 and C dynamic libraries 335 function integrally so that C dynamic libraries 335 and the Java graphical user interface 215 are able to communicate. Native interface 220 utilizes either FIRDESIGN 331 corresponding to a FIR filter design or IIRDESIGN 332 corresponding to an IIR filter design. A program corresponding to a General Input and Output design is not required in native interface 220 because processing of data is not associated with this design; instead, data input by the user are only plotted.

An example of FIRDESIGN 331 specified in accordance with one embodiment of the present invention is described in Code Section I below.

Code Section I - Exemplary FIRDESIGN

```
/**
 * Class firdesign - Dynamic link C-library
 * @version %I% %G%
 * @see exfir
 *
 */
class firdesign {
    public firdesign() {};
    public native String firdd(double argsup[]);
    static{
    System.loadLibrary("fird");
    }
}
```

An example of IIRDESIGN 332 specified in accordance with one embodiment of the present invention is described in Code Section J below.

Code Section J - Exemplary IIRDESIGN

```
/**
Class iirdesign - Dynamic link C-library
 * @version %I% %G%
 * @see exiir
 *
 */
class iirdesign {
        public iirdesign() {};
        public native String iirdd(double argsup[]);
        static {
        System.loadLibrary("iird");
        }
}
```

With reference again to FIG. 3, C dynamic libraries 335 provide the FIR and IIR execution cores used to process the data. C dynamic libraries 335 are implemented by digital signal processing unit 225 of FIGS. 2A and 2B. C dynamic libraries 335 process both static and dynamic (time-variant and continuous) data, and output a two-dimensional display in accordance with graphical user interface 215 described above. C dynamic libraries 335 are used for the process calculations for FIR and IIR and also write the respective output files for each, including the coefficients of each filter. The processes employed in C dynamic libraries 335 are known in the art, such as those found in "Signal Processing Algorithms in MATLAB," published by Prentice Hall, 1996. However, it is understood that the present invention could use other processes for digital signal processing.

C dynamic libraries 335 are implemented using the C program code. Thus, the present embodiment of the present invention advantageously uses the C program code for the timing critical portion of digital signal processing, because C is more efficient than Java for that purpose and requires less computational resources. The present embodiment advantageously utilizes the Java program code for the graphical user interface, because Java provides a more user-friendly interface for that purpose.

In summary, with reference to FIG. 3, in one embodiment of the present invention, a user would execute DSP 200 using executable 205 of FIG. 2B. Alternatively, a user executes DSP 200 using a Java interpreter (e.g., virtual machine 210 of FIG. 2A). In the present embodiment, the present invention then generates a display on the computer system's output device (that is, a menu bar or icon is displayed on the computer system's display monitor or like device). Using the displayed graphical user interface of the present invention, the user selects the type of filter to be applied to the data that are to be analyzed. Based on this input, the present invention generates and displays additional menus or icons to receive filter design parameters that are specified by the user. The data are processed by C dynamic libraries 335 according to the filter selected by the user, and displayed on the computer system's output device in accordance with the user's specifications. The user can manipulate the display using the graphical user interface provided by the present invention, or can print the results. Thus, the present invention provides an easy-to-use DSP method that is compatible with a user's experience. The present invention is also not limited to a single type of platform.

Figure 4A:
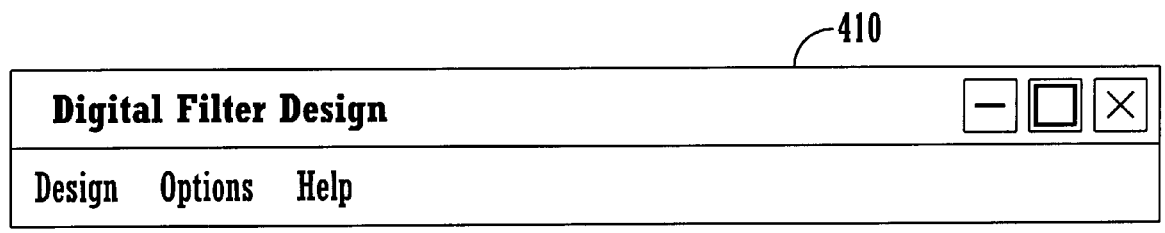
FIG. 4A shows a menu bar on a Windows platform for selecting a filter type in accordance with one embodiment of the present invention.

With reference now to FIG. 4A, the application of one embodiment of the present invention on the Microsoft Windows 95 platform is demonstrated. Menu bar 410 is generated using front-end graphical user interface 310 and AppletFrm 320 (FIG. 3) and displayed on the display device of a computer system (e.g., display device 105 of FIG. 1).

Figure 4B:
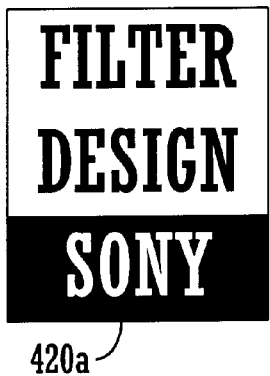
FIG. 4B shows icons on a Solaris platform for selecting a filter type in accordance with one embodiment of the present invention.
Figure 4B:
Figure 4B:
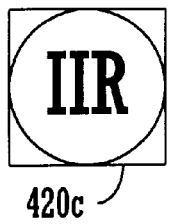
Figure 4B:
Figure 4B:

With reference to FIG. 4B, the application of one embodiment of the present invention on the Solaris platform is demonstrated. Icons 420a, 420b, 420c 420d and 420e of display 420 are generated using front-end graphical user interface 310 and AppletFrm 320, and displayed on the display device of a computer system (e.g., display device 105 of FIG. 1).

With references to FIGS. 4A and 4B, the user would utilize menu bar 410 and display 420 to select the type of filter (e.g., FIR, IIR or general input and output) to be applied for the digital signal processing.

With reference next to FIG. 5A, once the type of filter has been selected, the design window for that filter type is displayed on the computer system's display device. The design window is generated for the selected filter type using FEFIR 316, FEIIR 317 or FEGD 318 and AppletFrm 320 of FIG. 3. In accordance with one embodiment of the present invention, window 510 for a FIR filter is illustrated on the Solaris platform. Using window 510, the user specifies the parameters to be used to design the filter, such as the type of window (e.g., Hamming) and other like parameters known in the art.

With reference now to FIG. 5B, in a similar manner, window 520 for an IIR filter is illustrated on the Windows 95 platform.

In the same manner as illustrated by FIGS. 5A and 5B, a similar window is generated for the general input and output design.

Figure 6A:
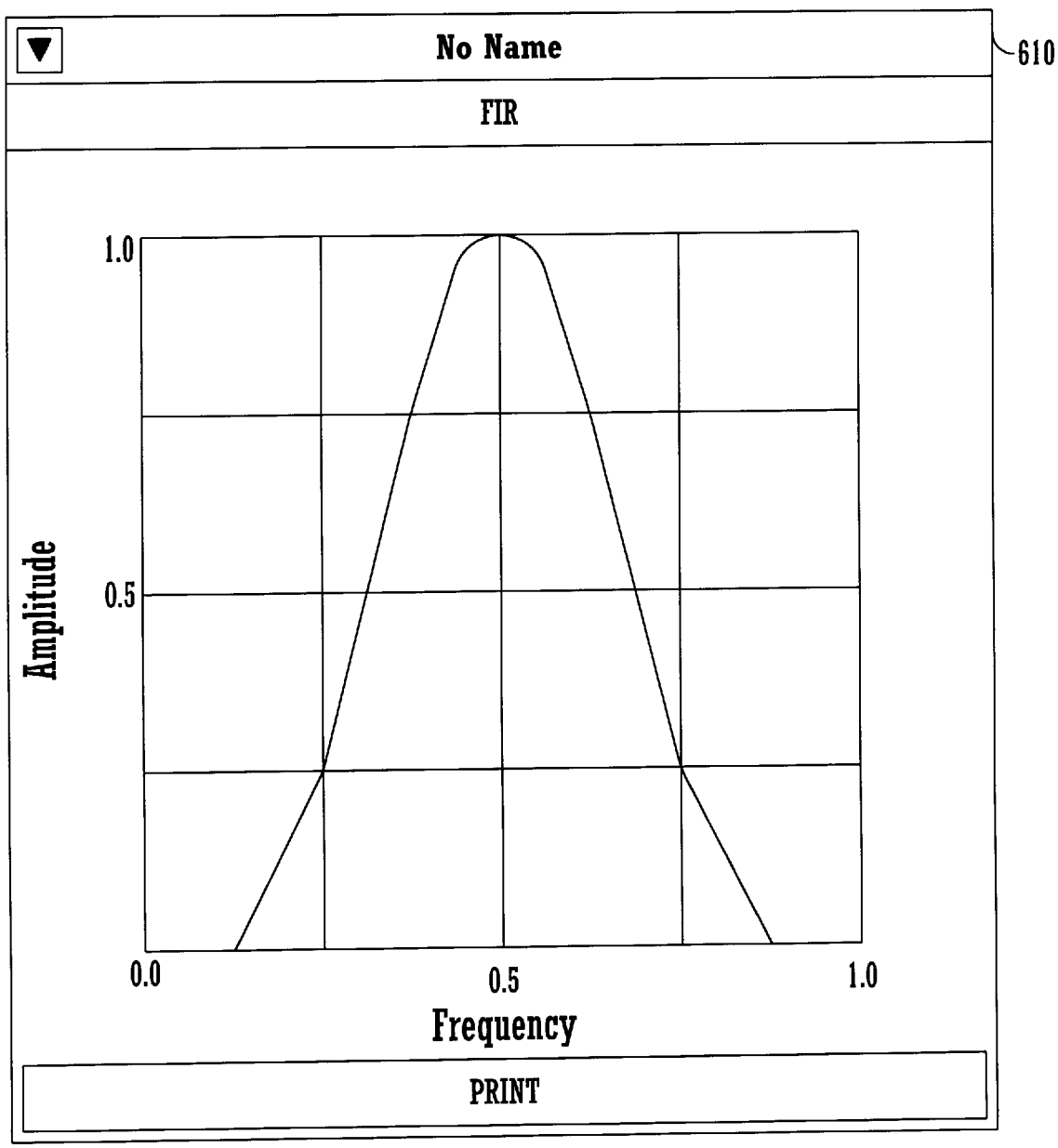
FIG. 6A shows results plotted on a computer system's display device for a Solaris platform in accordance with one embodiment of the present invention.

With reference to FIG. 6A, the results of the digital signal processing are illustrated on the computer system's display device. The results are generated using C dynamic libraries 335 of FIG. 3, and depending on the type of filter are displayed using either EXFIR 326, EXIIR 327 or EXGD 328 and AppletFrm 320 of FIG. 3. In accordance with one embodiment, plot 610 showing amplitude response of a FIR filter is illustrated on the Solaris platform.

Figure 6B:
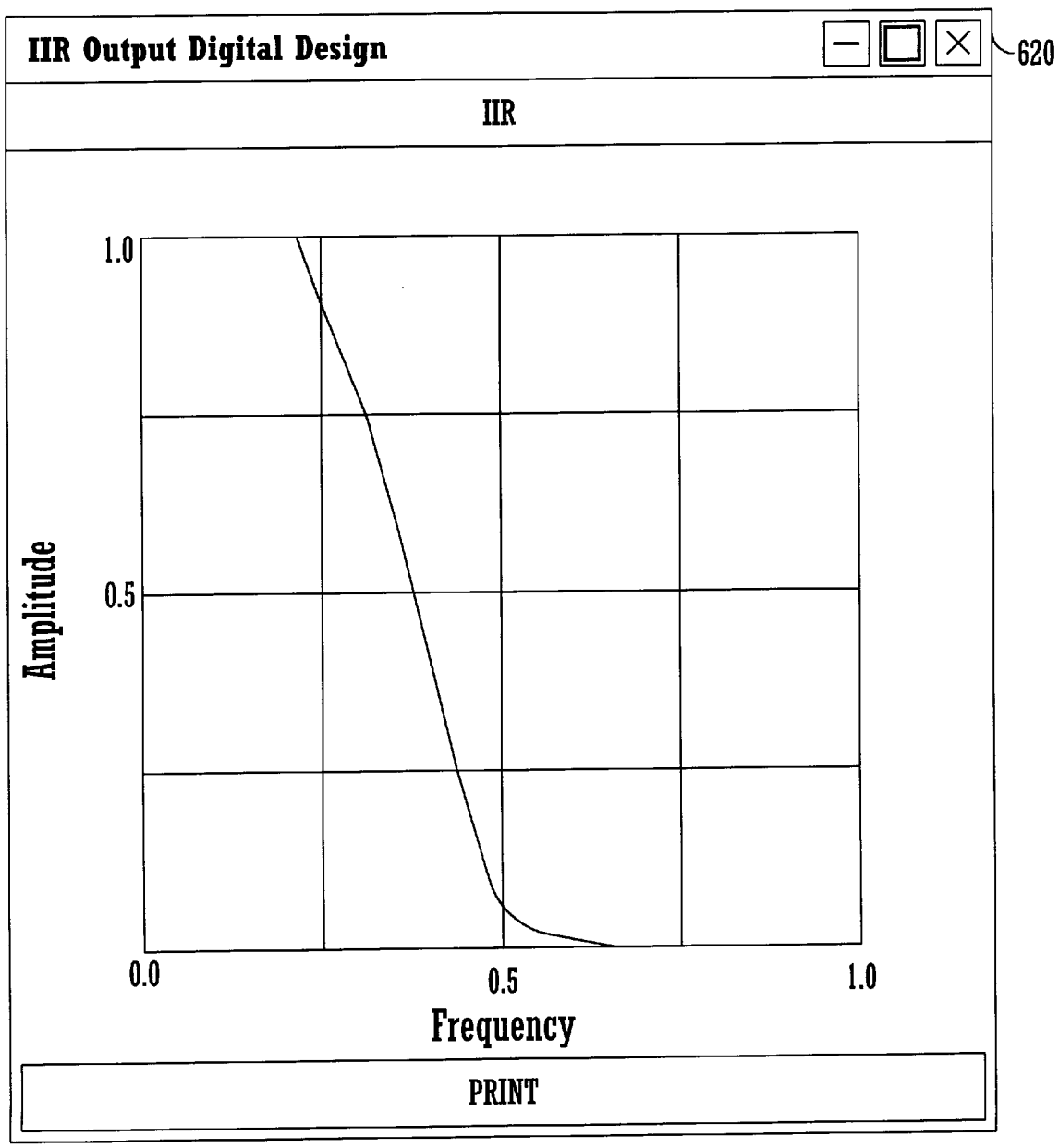
FIG. 6B shows results plotted on a computer system's display device for a Windows platform in accordance with one embodiment of the present invention.

With reference to FIG. 6B, in a similar manner, plot 620 showing amplitude response of an IIR filter is illustrated on the Windows 95 platform.

In the same manner as that illustrated by FIGS. 6A and 6B, a similar window is generated for the general input and output design.

Figure 7:
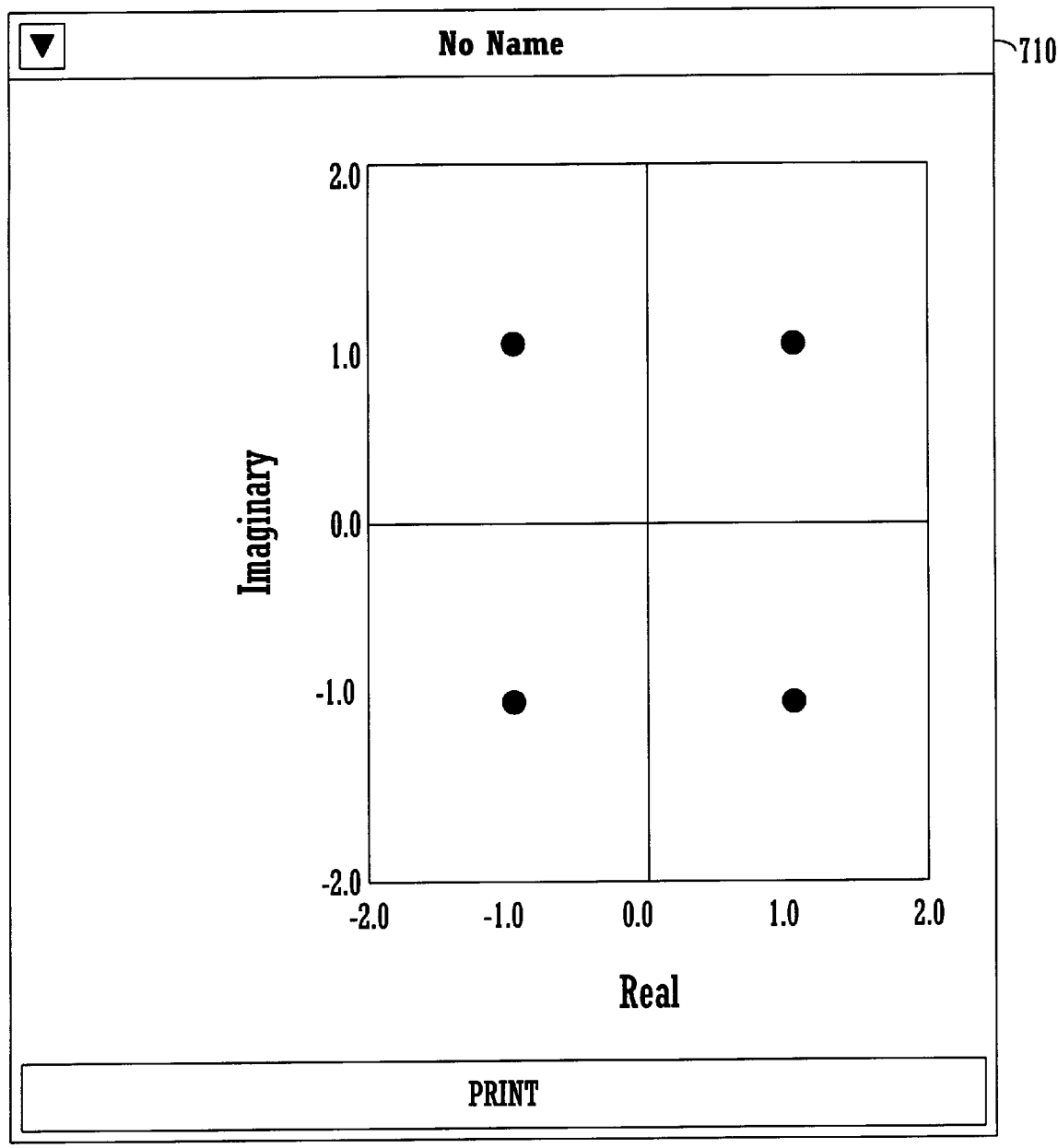
FIG. 7 shows a constellation display in accordance with one embodiment of the present invention.

With reference to FIG. 7, the application of one embodiment of the present invention as a constellation display tool is illustrated for a Solaris platform. Constellation display 710 simulates the real and imaginary parts of a signal. Constellation display 710 is a real-time DSP design that processes time-variant and continuous input data. The display is updated at a predetermined frequency (e.g., once per second) using a single Java thread.

Embodiments of the present invention are demonstrated above for the Solaris and Windows 95 platforms. However, it is understood that the present invention is not limited to these platforms and may be practiced on other platforms. In addition, it is understood that FIR designs, IIR designs, or general input and output designs can be used with each platform.

Thus, the present invention provides a method that allows a single version of digital signal processing software 200 to perform on more than one type of platform. The present invention also provides a method that accomplishes the above need and is compatible with existing computer systems and the experience of current users.

The preferred embodiment of the present invention, Cross-Platform DSP Designs Using Java and C, is thus described. While the present invention has been described in particular embodiments, it should be appreciated that the present invention should not be construed as limited by such embodiments, but rather construed according to the following claims.

What is claimed is:

1. In a computer system having a processor coupled to a bus, a memory unit coupled to said bus and a user input device and a user output device, a software implemented digital signal processing system, said digital signal processing system comprising:

a digital signal processing unit implemented in C program code, said digital signal processing unit for receiving data and for applying a process to said data to generate therefrom a computer file representative of a processed response;

a graphical user interface implemented in Java program code, wherein said graphical user interface is for generating two-dimensional graphic images and text on said user output device; and interface code for providing communication between said graphical user interface and said digital signal processing unit, said interface code implemented in Java program code and operable such that said digital signal processing unit and said graphical user interface, in combination, are hardware platform-independent.

2. A software implemented digital signal processing system as described in claim 1 wherein said graphical user interface comprises an interface for receiving user-selected process parameters.

3. A software implemented digital signal processing system as described in claim 1 wherein said graphical user interface comprises an interface for displaying said processed response.

4. A software implemented digital signal processing system as described in claim 1 wherein said interface code is platform-independent and operable such that said interface code communicates with said digital signal processing unit implemented in C program code.

5. A software implemented digital signal processing system as described in claim 1 wherein said digital signal processing unit implemented in C program code is a finite impulse response filter design.

6. A software implemented digital signal processing system as described in claim 5 wherein said graphical user interface displays the amplitude response, the phase response and the impulse response for low-pass, high-pass, band-pass and band-stop filters.

7. A software implemented digital signal processing system as described in claim 5 wherein said graphical user interface employs rectangular, tapered rectangular, triangular, Hanning, Hamming, and Blackman window functions.

8. A software implemented digital signal processing system as described in claim 1 wherein said digital signal processing unit implemented in C program code is an infinite impulse response filter design.

9. A software implemented digital signal processing system as described in claim 8 wherein said digital signal processing unit comprises Chebyshev Type I, Chebyshev Type II, and Butterworth filters.

10. A software implemented digital signal processing system as described in claim 1 wherein said digital signal processing unit implemented in C program code is a general input and output design.

11. A computer system comprising:
a processor coupled to a bus;
a memory unit coupled to said bus;
a user input device; and
a user output device, wherein said memory unit comprises a software implemented digital signal processing system comprising:
a digital signal processing unit implemented in C program code, said digital signal processing unit for receiving an input stream of data and for applying a process to generate therefrom a computer file representative of a processed response;
a graphical user interface implemented in Java program code, wherein said graphical user interface is for generating two dimensional graphic images and text on said user output device; and
interface code for providing communication between said graphical user interface and said digital signal processing unit, said interface code implemented in Java native interface code and operable such that said digital signal processing unit and said graphical user interface, in combination, are hardware platform-independent.

12. A computer system as described in claim 11 wherein said graphical user interface comprises an interface for receiving user-selected process parameters.

13. A computer system as described in claim 11 wherein said graphical user interface comprises an interface for displaying said processed response.

14. A computer system as described in claim 11 wherein said interface code is platform-independent and operable such that said interface code communicates with said digital signal processing unit implemented in C program code.

15. A computer system as described in claim 11 wherein said digital signal processing unit implemented in C program code is a finite impulse response filter design.

16. A computer system as described in claim 15 wherein said graphical user interface displays the amplitude response, the phase response and the impulse response for low-pass, high-pass, band-pass and band-stop filters.

17. A computer system as described in claim 15 wherein said graphical user interface employs rectangular, tapered rectangular, triangular, Hanning, Hamming, and Blackman window functions.

18. A computer system as described in claim 11 wherein said digital signal processing unit implemented in C program code is an infinite impulse response filter design.

19. A computer system as described in claim 18 wherein said digital signal processing unit comprises Chebyshev Type I, Chebyshev Type II, and Butterworth filters.

20. A computer system as described in claim 11 wherein said digital signal processing unit implemented in C program code is a general input and output design.

21. In a computer system having a processor coupled to a bus, a memory unit coupled to said bus and a user input device and a user output device, a software implemented digital signal processing system, said digital signal processing system comprising:
digital signal processing unit means implemented in C program code, said digital signal processing unit means for receiving an input stream of data and for applying a process to generate therefrom a computer file representative of a processed response;
graphical user interface means implemented in Java program code, wherein said graphical user interface means is for generating two-dimensional graphic images and text on said user output device; and
interface code means for providing communication between said graphical user interface means and said digital signal processing unit means, said interface code means implemented in Java program code and operable such that said digital signal processing unit means and said graphical user interface means, in combination, are hardware platform-independent.

22. A software implemented digital signal processing system as described in claim 21 wherein said graphical user interface means comprises an input interface means for receiving user-selected process parameters and displaying said processed response.

23. A software implemented digital signal processing system as described in claim 21 wherein said interface code means is platform-independent and operable such that said interface code means communicates with said digital signal processing unit means implemented in C program code.

24. A software implemented digital signal processing system as described in claim 21 wherein said digital signal processing unit means implemented in C program code comprises:
a finite impulse response filter design means;
an infinite impulse response filter design means; and
a general input and output design means.

25. A software implemented digital signal processing system as described in claim 21 wherein said graphical user interface means displays the amplitude response, the phase response and the impulse response for low-pass, high-pass, band-pass and band-stop filters.

26. A software implemented digital signal processing system as described in claim 21 wherein said digital signal processing means employs rectangular, tapered rectangular, triangular, Hanning, Hamming, and Blackman window functions.

27. A software implemented digital signal processing system as described in claim 21 wherein said digital signal processing means comprises Chebyshev Type I, Chebyshev Type II, and Butterworth filters.

* * * * *